United States Patent [19]

Cairenius

[11] 4,343,191
[45] Aug. 10, 1982

[54] FLUID FLOW METER

[76] Inventor: Runo M. J. Cairenius, 195 Kennedy Rd. South, Ste. 309, Brampton, Ontario, Canada, L6W 3H2

[21] Appl. No.: 158,526

[22] Filed: Jun. 11, 1980

[51] Int. Cl.³ .............................................. G01F 1/70
[52] U.S. Cl. .................................. 73/861.05; 73/255
[58] Field of Search ................ 73/255, 861.05, 861.32

[56] References Cited

U.S. PATENT DOCUMENTS

| | | | |
|---|---|---|---|
| 818,566 | 4/1906 | Scotti | 73/255 X |
| 4,118,980 | 10/1978 | Debeaux | 73/861.05 |
| 4,157,660 | 6/1979 | Spacek | 73/255 |
| 4,263,812 | 4/1981 | Zeigner | 73/861.05 |

FOREIGN PATENT DOCUMENTS 1209547 10/1970 United Kingdom ................. 73/255

*Primary Examiner*—Herbert Goldstein

[57] ABSTRACT

This invention is a fluid flow meter with pulse output proportional to the fluid flow rate. The pulse is transduced by means of a pick-off sensor from the by-passing of a ball which travels in a toroidal passageway at speed close to that of the velocity of the fluid. The fluid flowing into the device follows a loop-shaped circular passageway while the ball travels in a closed circular passageway. Fluid flow propels the ball to revolve continually at a rate directly proportional to the flow rate of the fluid.

3 Claims, 3 Drawing Figures

FLUID FLOW METER

BACKGROUND OF THE INVENTION

Hitherto, the many fluid flow metering requirements have resulted in numerous different types of flow meters. The operational principles of flow meters vary a lot; listed here are a few classes: differential pressure flow meters, mass flow meters, area flow meters, electromagnetic flow meters, positive displacement flow meters, and open channel flow meters. All of these have specific areas of application but have also their limitations, as for example: some do not operate in reverse flow conditions; some must be mounted only in one position; some do not work well with soily or opaque liquids; some require individual calibration; some are not easily convertible to digital display output nor remote display; some must have see-through tubes; and some may become damaged by pressure variations or by changes in physical state of the fluid being measured.

One aspect appears to be common to a great many flow meters: the price—they are quite expensive. In many cases this is the result of the intricate nature of the device and the resultant high degree of accuracy required in manufacturing the component parts. In other cases individual calibration is a necessary requirement leading to the high price.

The idea in the present invention is to have as a moving part a ball and as a housing material having groves and holes, through which fluid may flow unobstructively, thus causing the ball to follow the total volumetric velocity of the fluid without leaving the housing body. This permits the revolutions to be counted, and from this volume, flow rate and other data can be computed, indicated, recorded and controlled.

It is an object of the present invention to accomplish accurate measurement of fluid flow in a way that allows inexpensive fabrication of the device through mass production.

Other objects of this invention are to make the device: respond well to changes in flow over a wide range of flow rates, especially in the laminar region; to handle pure fluids as well as true solutions, colloidial dispersions and suspensions of fluids; handle high viscosity liquid and non-Newtonian fluids; unsusceptible to changes in viscosity or temperature of the liquid; offer little resistance to fluid flow; unaffected from hammer effect; and capable of measuring pulsating flow.

Further objects of this invention are to provide a device which is simple in design, construction and operation; offers ease of installation and maintenance; and has long service life.

In this invention the ball in the housing will follow the fluid flow at a velocity very close to the velocity of the fluid. This invention may be classed as a positive displacement flow meter and an area-velocity integrating type flow meter as it has the characteristics of both. Making reference here to other similar looking devices having a spinning ball and two orifices on the outer surface of the toroid, and used as flow indicators, the basic difference to these is in the arrangement of the orifices, explained later, which makes these flow indicator devices perform differently and not part of the positive displacement flow meter category.

For the fluid there are one inlet and one outlet orifice located so that when the fluid entering at the inlet orifice has made almost one full round within its circular passageway, it will exit at the outlet orifice located almost opposite the inlet orifice. The ball will otherwise follow the mass of the fluid but, due to the shape and size of the outlet orifice, will not exit but travels past the boundary line between the incoming and outgoing fluids, only to start another cycle in the device. The pushing force of the fluid is continuous, without interruptions, between the inlet and outlet orifices.

The toroidal passageway in the housing is as round and circular in shape with as smooth a surface as can be manufactured without extra effort. The ball is only slightly smaller than its passageway to allow free travel, touching the wall of the passageway only at one point, as a rule, or occasionally, at two points on locations where an orifice is located, or at no point at all.

The inlet and outlet orifices in the passageway carry through the housing to the outside surface where connections to pipe, hose, tube or other fluid carrying enclosure or fitting can be made. A good direction to the holes thus formed is close to the line which is 17 degrees away from the direction of the tangent to the center line of the toroidal passageway, the 17 degree-line being on the perpendicular plane to the plane defined by the toroid's centre line and the tangent to the centre line. The above direction minimizes friction and turbulence; however, deviations from said direction up to 45 degrees to the plane defined by the centre line do not make the device inoperative. The two orifices, formed where the holes from the exterior connection means meet the toroidal passageway, are on the opposite sides on the passageway but slightly off, allowing the fluid to flow easily into and out of the passageway.

The most prevelent application of this invention is envisioned as that of measuring flow rates of liquids in situations where digital read-out is required, or, where signals, directly proportional in frequency to the flow rate, carry the information to the processor. To the large family of different types of flow meters this invention is a newcomer, suitable for many uses. For example, this invention can be used when an inexpensive device with electronic pulse output, together with a signal processor, is required, e.g. in aircraft for measurement of gasoline consumption. In automobiles and boats and ships this invention can provide similar invention.

In any watercraft this invention, when installed to read water speed, can measure the speed of the vessel, the distance travelled, etc.

In industrial applications the flow rate of many types of liquids can be measured because the invention can be made of metals or plastics. Monitoring, batching and totalizing of volumes of liquids as part of process control is just a matter of selecting the appropriate signal processor.

From the foregoing it should be apparent that the application of the present invention overcomes numerous objections heretofore encumbering the measuring of fluid flow, one important feature being the freedom of mounting in any position.

In the following explanatory description of this invention reference is made to the accompanying drawings, to wit:

Figure 1:
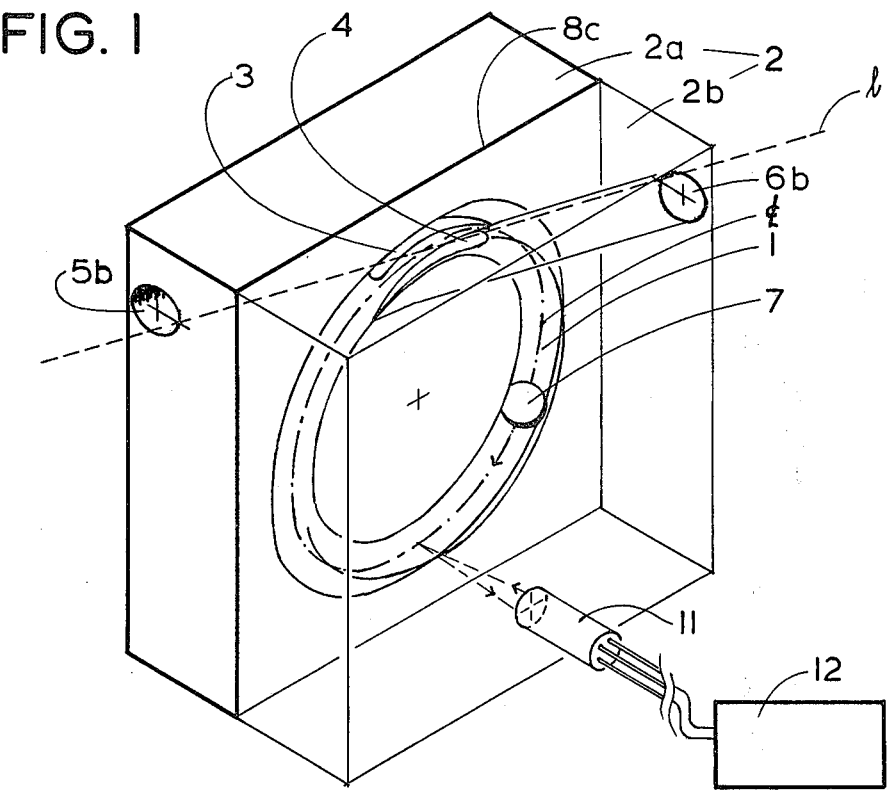
FIG. 1 is an isometric view, half-way transparent, of the fluid flow metering device.
Figure 2:
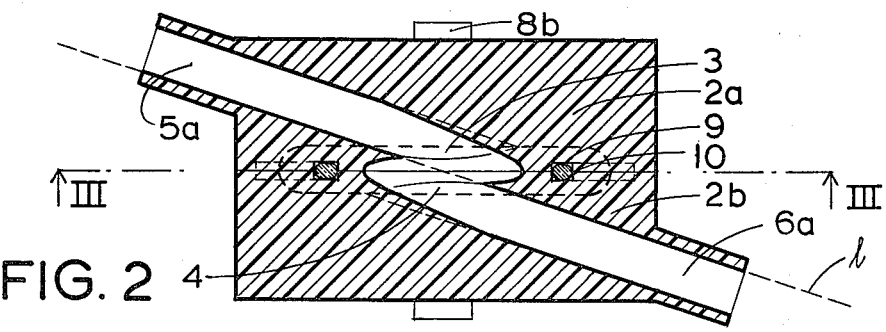
FIG. 2 is a sectional view of the fluid flow metering device taken in the plane indicated by line II—II of FIG. 3, and showing the location of the toroidal orifices in relation to each other and to the external connection means. This view also shows the male-type external connection means and the clamp-type fastening means of the housing halves.
Figure 3:
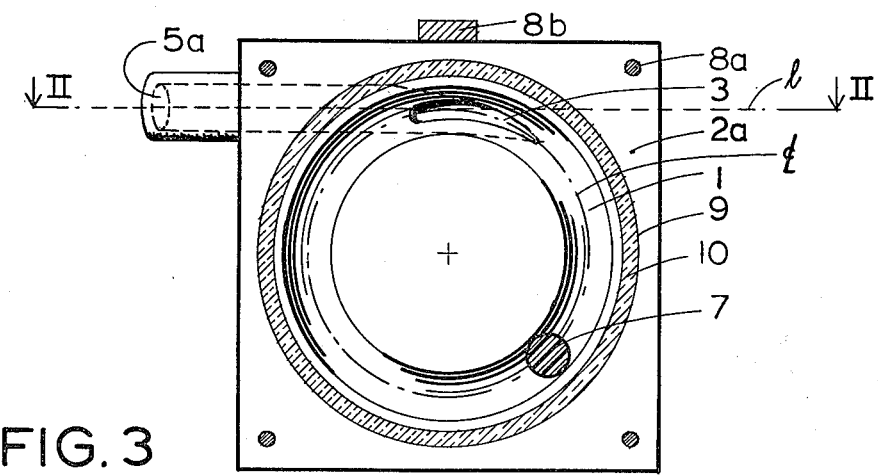

FIG. 3 is a sectional view of the fluid flow metering device taken in the plane indicated by line III—III of FIG. 2, and showing the ideal location of the inlet orifice in relation to the external connection means and to the toroidal passageway. This view also shows the male-type input connection means and the screw-nut type fastening means of the housing halves. The sectional view taken in the opposite direction of the plane III—III is identical to this one.

It is considered that the most advantageous application of the idea embodied in this invention is to be found in a fluid flow metering device constructed as follows:

The passageway 1, shaped as a toroid, is formed by two housing halves 2a and 2b, each having a grove of semicircular section, when the housing halves 2a and 2b are fastened together. The housing halves 2a and 2b also contain the orifices 3 and 4, leading, within the housing halves 2a and 2b, to the inlet and outlet connection means, male 5a and 6a, or female 5b and 6b.

In operation the flow of fluid through the device can be in either direction, and the use in this specification of terms 'inlet' and 'outlet' is only for clarity of description. Also, the connecting means may be male, female, or other as per need.

The ball 7 enclosed within the passageway 1 is the only moving component. The diameter of the ball 7 is slightly less than the diameter of the passageway 1.

The inlet orifice 3 and the outlet orifice 4 in the passageway 1 are sized, shaped and located is such a manner that the fluid flowing through the passageway 1 will move with little friction and will direct its force in the direction of its travel.

The size of the orifices 3 and 4 is close to the cross-sectional area of the inlet and outlet connection means 5a or 5b and 6a and 6b as well as to the passageway 1. This reduces the minor losses due to acceleration and deceleration of the fluid, and thus the overall pressure drop across the fluid flow meter, to the minimum.

The shape of the orifices 3 and 4 is, preferably, close to that of a droplet. When fluid enters the passageway 1 at an angle less than 45 degrees this shape directs the centre of mass of the fluid towards the centre line $\mathcal{L}$ of the passageway 1.

The location of the orifices 3 and 4, when viewed in the direction of line 1, is such that the droplet heads are touching but not overlapping each other, and the two holes connecting the orifices 3 and 4 with the inlet and outlet connection means 5a or 5b and 6a and 6b are off by one hole width as shown in FIG. 2. At the location between the orifices 3 and 4 on the line 1 the incoming fluid meets and directs out the fluid just as it is about to complete a revolution in the passageway 1. Thus all fluid enters the passageway 1 without shortcutting to the opposite outlet orifice 4, and, consequently, the ball has the least distance to clear without propulsion before starting a new round.

The means of fastening the housing halves 2a and 2b are: 8a is a typical rivet, screw, screw-nut combination, or similar; 8b is a clamp outside the housing 2; and 8c is a permanent bond. Fastening means 8a and 8b require the gland 9 and seal 10 outside the passageway 1 to make a fluidtight joint.

The pick-off means 11 is located perpendicular to the passageway 1 and may operate on the optoelectronic principle, if the housing halves 2a or 2b, or both or part of them are transparent; or, may operate on the proximity sensing principle, e.g. inductive, capacitive, or magnetic, if the housing halves 2a and 2b are opaque.

The signal processor 12 is equipped with proper readout display and is connected to the pick-off means 11.

All materials embracing the fluid are impervious and joined to form a fluidtight enclosure. Either thermoplastics or thermosetting plastics can be utilized for this purpose, as can other materials, such as metals and glass. Selecting appropriate materials for the housing halves 2a and 2b and the ball 7 involves taking into consideration the effect the fluid will have on the materials and the requirements of the pick-off means, and the workability of the materials. Selecting proper material for the ball 7 also involves choosing a material with low specific gravity, or if a material with high specific gravity is chosen, e.g. a ferromagnetic plastic, then the ball 7 would have to be hollow to reduce its weight.

I have discovered that device, being otherwise similar but having holes at different angles, i.e. angles formed by the line 1 and the plane on the centre line $\mathcal{L}$ of the toroid, perform differently. Other factors being same, devices having different size passageways, also perform slightly differently. In theory, viscosity of the fluid being measured has the dominating effect on the above performance; however, in practice, with proper dimensioning, the effect of viscosity on this invention is less than on most other types of flow meters.

I claim:

1. A fluid flow transducer comprising
two housing halves of impervious material both having a groove of circular shape and of semicircular cross-section, said grooves forming a toroidal passageway for fluid in said housing when combined, one orifice in each said housing half at the bottom of said groove, said orifices being, when said housing halves combined, located on opposite sides of said passageway and being off-set from the exact opposite location by one full revolution of said combined housing halves less one distance of the orifice diameter, one connection means for fluid on the outside of each said housing half connected to said corresponding orifice in parallel direction that is less than 45 degrees but more than 5 degrees to the plane defined by the center line of said toroidal passageway, characterized in that the cross-sectional areas of said toroidal passageway, said orifices and said connection means are equal or nearly equal,
a ball slightly smaller than the inner diameter of said passageway,
fastening means to form a fluidtight enclosure of said two housing halves, whereby the motion of said ball indicates the velocity of fluid.

2. A fluid flow meter according to claim 1 wherein a pick-off means is positioned close to said passageway.

3. A fluid flow meter according to claim 2 wherein a signal processor is connected to said pick-off means.

* * * * *